June 3, 1969    J. T. SHORT    3,447,496
METHOD AND APPARATUS FOR SUPPLYING FLUID PRESSURE
Filed Dec. 20, 1966

Fig. 1.

INVENTOR
Joe T. Short

BY Irons, Birch, Swindler & McKie
ATTORNEYS

Fig. 2.

INVENTOR
Joe T. Short

Fig. 3.

INVENTOR
Joe T. Short

June 3, 1969            J. T. SHORT            3,447,496

METHOD AND APPARATUS FOR SUPPLYING FLUID PRESSURE

Filed Dec. 20, 1966

INVENTOR
Joe T. Short

United States Patent Office 3,447,496
Patented June 3, 1969

3,447,496
METHOD AND APPARATUS FOR SUPPLYING FLUID PRESSURE
Joe T. Short, West Point, Ga., assignor to Callaway Mills Company, La Grange, Ga., a corporation of Georgia
Filed Dec. 20, 1966, Ser. No. 603,301
Int. Cl. D05c *15/10*
U.S. Cl. 112—79      46 Claims

ABSTRACT OF THE DISCLOSURE

A method and apparatus for the supply of a fluid pressure medium through a fluid delivery line to a point of use including compressor means, venting valve means for venting said fluid delivery line, and unloading valve means for unloading said compressor means. In addition, control means are provided for actuating said venting valve means when an excessive pressure is attained in said fluid delivery line and subsequently, when a predetermined condition is attained, said condition including the continuation of said excessive pressure, actuating said unloading valve means to unload said compressor means. In this manner a fluid pressure medium supply system is provided which is responsive to varying demands, at the point of use, in a most effective and efficient manner.

---

This invention relates to fluid pressure systems and more particularly to a new and improved method and apparatus for controlling the supply of fluid pressure to such systems.

A variety of manufacturing and other processes employ equipment which is either wholly or partially operated by fluid pressure. Various problems have arisen in controlling the supply of fluid pressure to such equipment particularly where the demand for pressure varies substantially. Such variation may be inherent in particular processes or result from equipment stoppages; for example, the equipment may be stopped momentarily or longer to correct defects in the work, to perform maintenance or inspection and for various other reasons. The unpredictable variations in pressure demand consequent from such stoppages impose variable loading conditions on the pressure systems and have resulted in inefficient operation.

This invention is particularly applicable to the control of the air supply to multi-needle tufting machines which pass air through a yarn delivery channel in each needle to project the yarn through the channel. The pressure demands experienced in such machines are widely variable and unpredictable. When the tufting machine is in operation, the demand for air pressure through the yarn delivery channels is intermittent. Maximum pressure is required when the needle is projected through the backing material. No pressure is required when the needle is completely withdrawn from the backing material. When the tufting machine is stopped with the needles extended through the backing material, a maximum demand is imposed continuously upon the pressure supply system. Conversely, when the machine is stopped with the needles in a position withdrawn from the backing material, there is no air flow and therefore no demand upon the pressure system. As such stoppages occur for a variety of reasons, it is generally impossible to predict when or for how long they will occur or the position of the needles during each stoppage.

The present invention alleviates the aforementioned difficulties in the art by providing a new and improved method and apparatus for supplying fluid pressure. A primary object of this invention is the provision of a method and apparatus for supplying fluid pressure which automatically adjusts to accommodate for variations in pressure demands in an efficient manner.

A further object of this invention is to provide a pressure supply system having a fluid compressing means, said system being automatically adjustable to both short and long term reductions in pressure demand.

Another object of this invention is to provide a pressure supply system which automatically adjusts to extended periods of reduced or no pressure demand by unloading the fluid compressing means.

Other objects of this invention are: to provide a pressure supply system which, when unloading the fluid compressing means, seals off the discharge side of the compressor and bleeds off the remaining fluid in the compressor to thereby allow the compressing means to operate with a compression chamber of reduced pressure effectively decreasing the power required to operate the compressing means; to provide such a system which will, prior to unloading the compressing means, vent excess pressure from the system to thereby accommodate short-term equipment stoppages which cause short-term rises in the pressure level within the supply system; to provide such a system whereby the fluid pressure delivery passage from the compressing means to the consuming area is sealed off when the compressor is unloaded entrapping a predetermined quantity of compressed fluid such that sufficient pressure will exist when the pressure consuming equipment is again activated and before the compressor becomes fully loaded to supply additional pressure; to provide such a system which is fully operable without the necessity of space consuming, expensive pressure reservoirs within the system.

Other objects and advantages of this invention will become readily apparent to those skilled in the art from the following description taken in connection from the accompanying drawings wherein are set forth by way of illustration and example several embodiments of this invention.

Generally, the invention which accomplishes the above objects, may be described as a fluid pressure supply system having a supply line defining a fluid flow passage with a compressor means operatively connected in said line. The invention includes a venting means operatively mounted in communication with the flow passage on the discharge side of the compressor means for selectively venting the compressed fluid medium from the flow passage when the pressure in the system increases above a predetermined level. The invention includes a valve assembly operatively mounted in the fluid flow path for selectively closing the flow path to the compressing means to thereby unload the compressing means when the pressure in the system is maintained above the venting pressure either for a predetermined time or until a predetermined higher pressure is reached. The valve assembly again opens the flow path and loads the compressor when the pressure in the system again drops. In this manner short periods of high pressure (low demand) are accommodated by venting the system and extended periods of high pressure (low demand) are compensated for, first by venting and then by compressor unloading to thereby provide a fluid pressure supply system wherein automatic adjustment of system pressure occurs in response to varied and unpredictable demand levels.

The invention also includes a new and improved method of providing a compressed fluid medium in a system having variable demands including the steps of supplying fluid medium to the system and compressing said fluid medium by a fluid compressing means to provide the desired pressure in the system. The method comprising this invention further includes selective venting of the compressed fluid medium when the pressure in the system increases above a predetermined level. The method also includes the step of unloading the compressing means by ceasing the supply of the fluid medium to the compressing means after continued venting when the pressure either remains above the said predetermined level for a predetermined period or rises to a still higher predetermined level.

Figure 1:
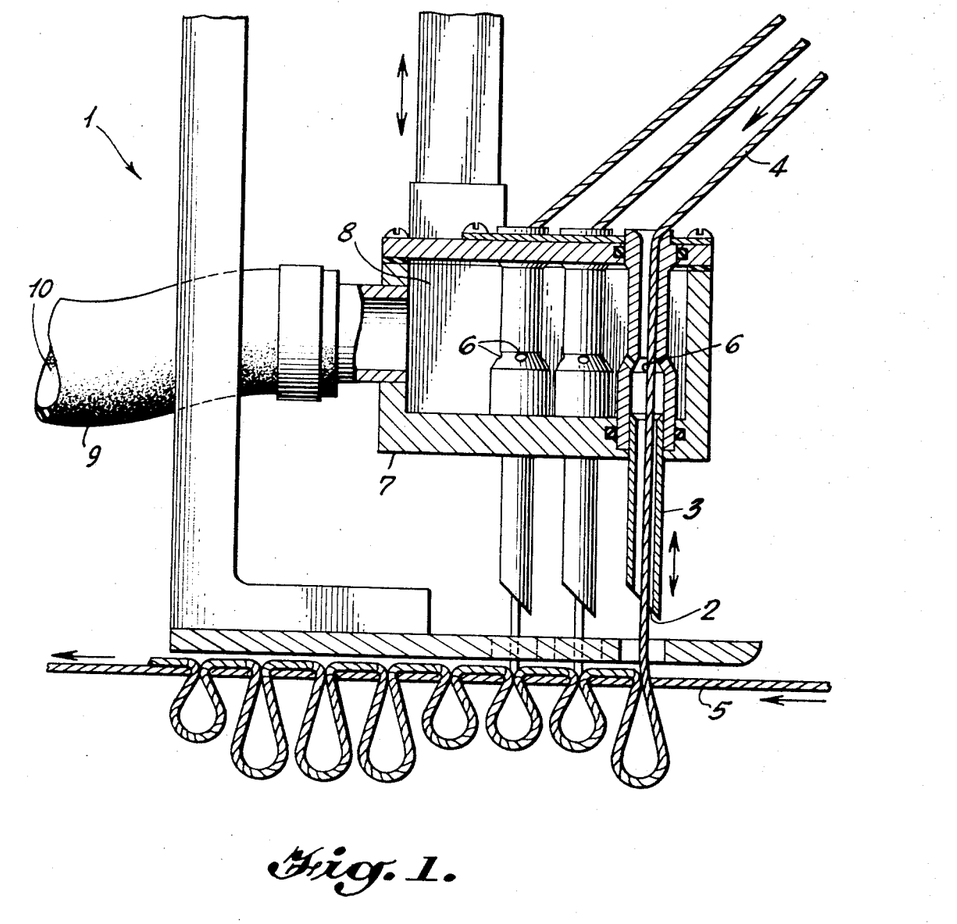
FIGURE 1 is a fragmentary, vertical sectional view taken through a multi-needle tufting machine illustrating the air flow system at the machine wherein air is supplied through each of the needles and into an axially extending yarn delivery channel.

Referring to FIGURE 1 of the drawings, the reference numeral 1 generally designates a multi-needle tufting machine which employs air flow through yarn delivery channels 2 in each of the individual tufting needles 3 to project the yarn 4 from the needles 3 as the needles 3 are being withdrawn through the backing material 5. Each of the tufting needles 3 has a plurality of ports 6 in communication with the yarn delivery channels 2 for passage of air to the channels 2. The tufting needles 3 are operatively retained for reciprocal movement relative to the backing material in a needle carrier 7, said needle carrier 7 defining an interior pressure chamber 8 suitably connected to an air pressure supply line 9 which defines an air flow passage 10 in communication with the air chamber 8 in the needle carrier 7 and channels 2 through the ports 6. The tufting apparatus 1 is fully described and illustrated in the patent issued to J. T. Short, No. 3,089,442 on May 14, 1963. It should be understood that the utilization of a fluid pressure supply system embodying the features of this invention has special application to tufting machines of the nature previously discussed; however, this invention also has general application to a wide variety of fluid pressure consuming apparatus particularly adaptable and significant in relation to such apparatus wherein the pressure demand is varied and unpredictable.

Figure 2:
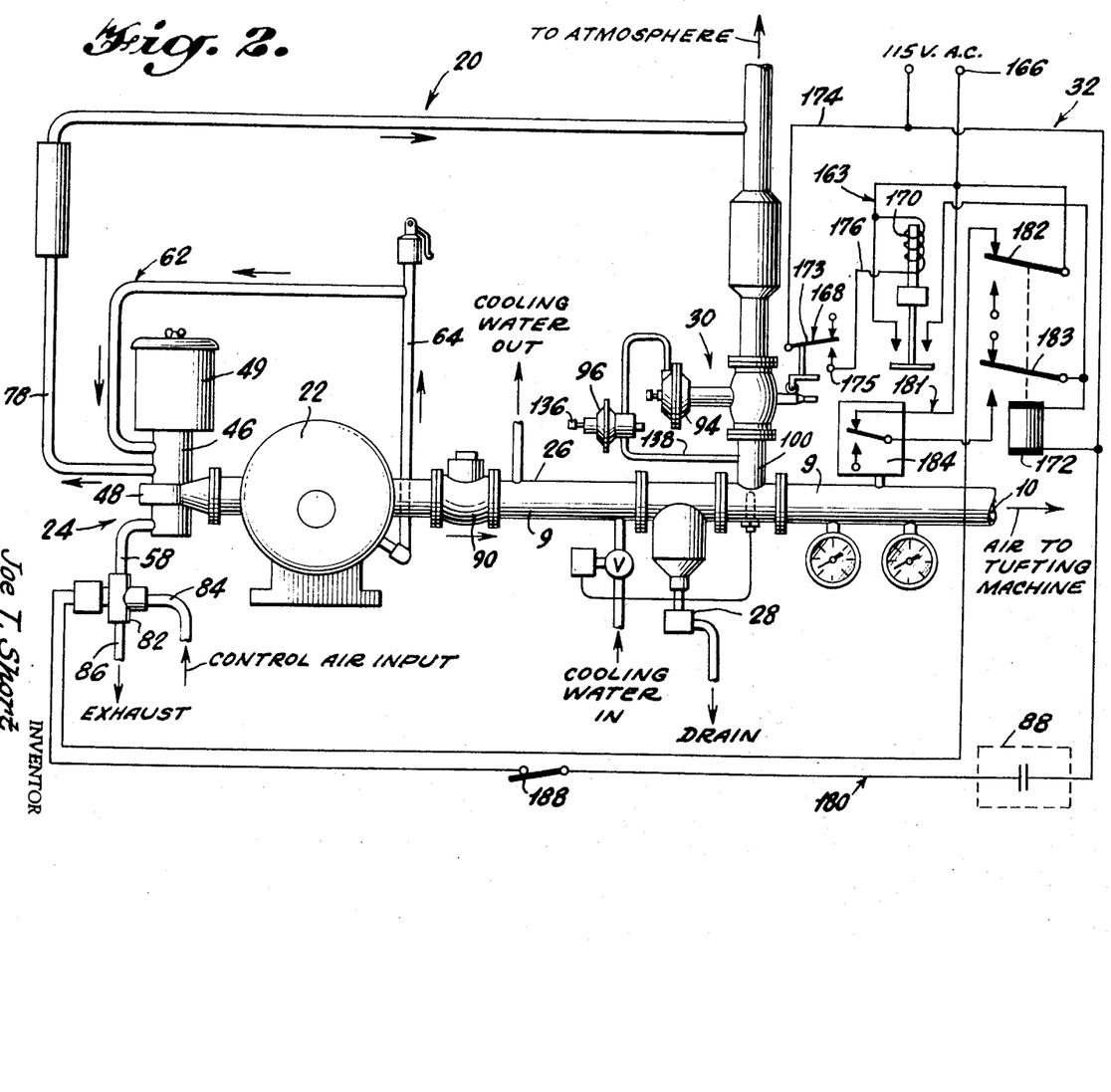
FIGURE 2 is a schematic view of an air pressure supply system to the tufting machine illustrated in FIGURE 1 and embodies the features of this invention.

As shown in FIGURE 2, the reference numeral 20 generally designates a fluid pressure supply system embodying the features of this invention and illustrated herein in operative relation to the tufting machine 1. The supply system 20, as illustrated, is basically comprised of the supply line 9 which defines the fluid flow passage 10, a compressor 22 operatively mounted in communication with said flow passage 10, a compressor unloading assembly 24, an after-cooler or heat exchanger 26, a moisture or oil separator assembly 28, a fluid pressure venting assembly 30, and an unloading valve actuating system or assembly 32.

Figure 3:
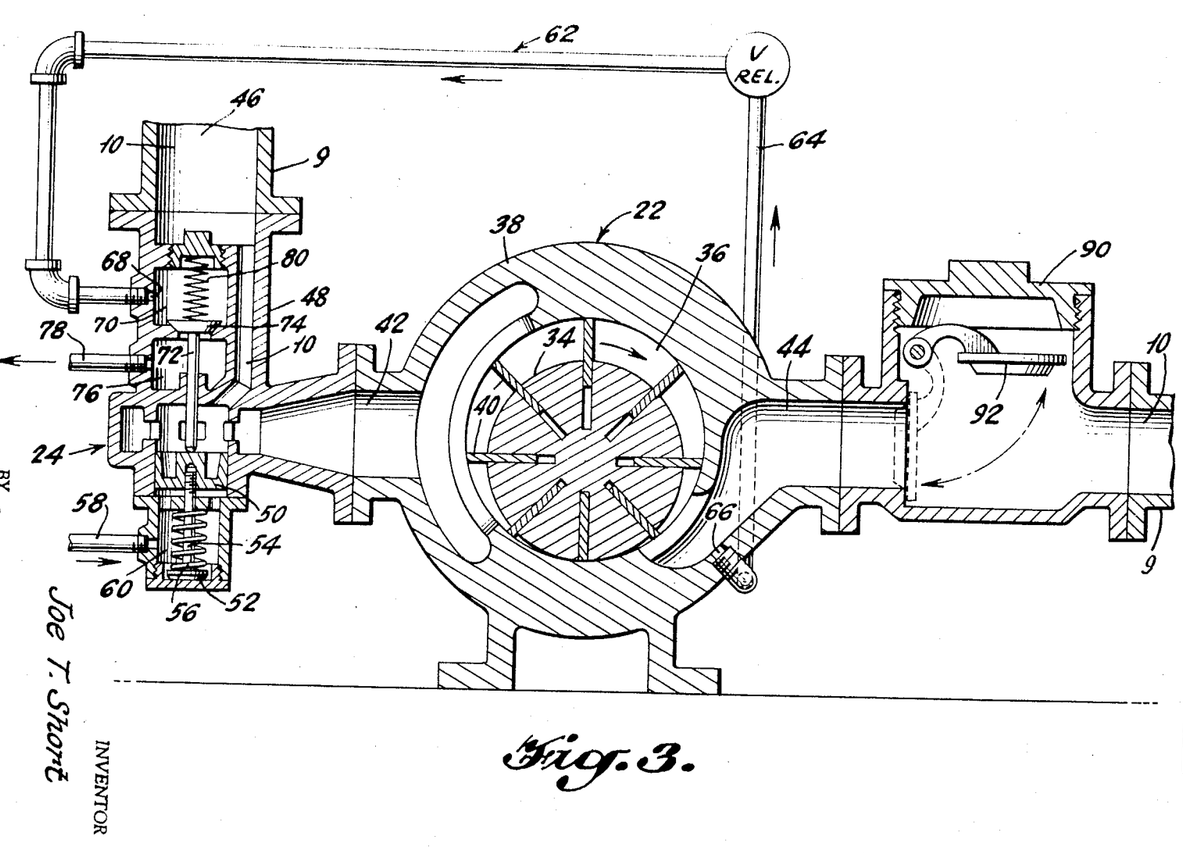
FIGURE 3 is a fragmentary, vertical sectional view taken longitudinally of the flow passage through the rotary compressor illustrated in FIGURE 2 showing a portion of the unloading valve assembly and a check valve downstream from the rotary compressor.

The compressor 22, as illustrated in FIGURE 3, is a positive displacement, rotary compressor having a rotor 34, eccentrically mounted in a pressure chamber 36 defined by a compressor housing 38, and operable in said chamber 36 by means of a plurality of sliding vanes 40 to compress air or other fluid medium supplied to the compressor 22 through the inlet or intake 42 for delivery through the discharge 44 to the fluid flow passage 10. The compressor 22 has been illustrated as a positive displacement, rotary type compressor. However, other types of compressors may be utilized in a fluid pressure supply system embodying the features of this invention.

In the illustrated embodiment, the supply line 9 has a fluid entry end portion 46 extending from an air filter 49 (FIGURE 2) to the inlet 42 of compressor 22 through a valve body 48. The valve body 48 is a component of the compressor unloading assembly 24 and, as shown in FIGURE 3, contains a valve member 50 for selectively blocking or closing the flow passage 10 on the inlet side of the compressor 22. The valve member 50 is movable between a first, open position and a second, passage blocking or closed position. The valve member 50 is biased out of its passage blocking position by a spring 56 which surrounds the valve stem 54 and acts against a flange 52 on the end of the stem 54. The valve member 50 is moved to its first or closed position by fluid pressure in a control chamber 60 within the valve body 48. Air may flow into the chamber 60 from the air line 58 to force the valve member 50 upwardly to close the flow passage 10. A release of air pressure from the chamber 60 permits the spring 56 to force the valve member 50 to its open position.

Connected between the valve body 48 and the compressor discharge 44 is a compressor bleeding assembly 62 which is operable in response to closing movement of the valve member 50 to exhaust entrapped air in the pressure chamber 36 of the compressor 22. Thus, the rotor 34 may operate in a chamber having a substantially reduced pressure, virtually a vacuum, to greatly decrease the power requirements for operating the unloaded compressor 22.

The compressor bleeding assembly 62 includes piping 64 having an inlet 66 in communication with the outlet 44 of the compressor 22 and an outlet 68 in communication with a first interior pressure chamber 70 within the valve body 48. The bleeding assembly 62 has a valve member 72 with a valve head 74 movable in response to movement of the valve member 50 to open the pressure chamber 70 to an exhaust chamber 76 and an exhaust line 78 upon movement of the valve member 50 to a passage blocking position. Thus, compressed air entrapped at the discharge side of the compressor 22 may flow through the piping 64 to the chamber 70 and outwardly through the exhaust chamber 76 and exhaust piping 78. As illustrated, the valve member 72 is spring biased by the spring 80 into a closed position thereby maintaining the bleeding assembly inactive until the compressor 22 is unloaded by the movement of the valve member 50.

The air flow into the chamber 60 of the valve body 48 for actuating the valve member 50 is controlled by a three-way solenoid valve 82 (FIGURE 2) which has a control air input pipe 84, exhaust pipe 86 and the piping 58 connecting the solenoid valve 82 to the chamber 60. The solenoid valve 82 is normally energized and arranged to provide air for the unloading of the compressor 22 when de-energized. It is, therefore, possible for the solenoid valve 82 to be electrically interconnected with a motor starter 88 for effecting an automatic initial unloading when the motor to the compressor 22 is started.

A check valve 90 is operatively connected in the supply line 9 on the discharge side of the compressor 22. The valve 90 includes a swingable valve member 92 (FIGURE 3) movable into a passage sealing position upon unloading of the compressor 22 to thereby prevent back flow of the pressure medium in the flow passage 10 when the compressor 22 is bled through the assembly 62. The valve member 92 is swingable out of this sealing position by loading of the compressor and discharge of the fluid medium from the compressor 22 by the pressure of the medium itself.

Pressure demand reductions due to equipment stoppage, slow down and the like are initially compensated for by venting the excess pressure from the flow passage 10. If the demand reduction is of a short-term nature, it will be compensated for exclusively by venting of the system whereas long-term demand reductions are accommodated both by venting and by compressor unloading respectively in a two-stage manner. The venting assembly 30 is basically comprised of a venting valve 94 and a pressure regulator 96.

Figure 4:
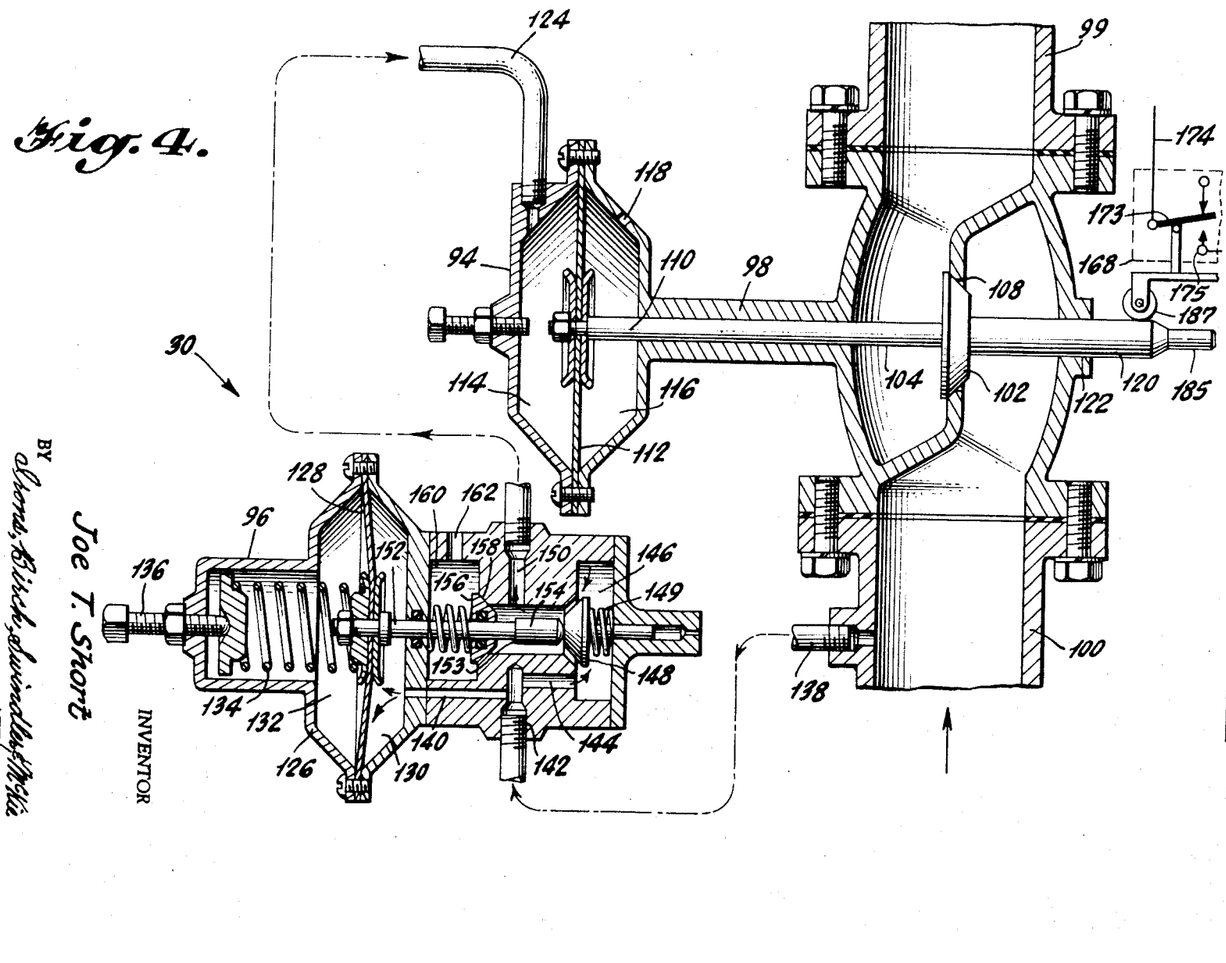
FIGURE 4 is a fragmentary, vertical sectional view taken through the venting valve and pressure regulator illustrated in FIGURE 2 to show the system employed for venting of the fluid flow passage.

As shown in FIGURES 2 and 4, the venting valve 94 includes a housing 98 operatively connected by an exhaust conduit 99 to atmosphere and by T fitting 100 to the supply line 9. A valve member 102 is movable in the housing 98 relative to a valve seat 108 for selectively venting or sealing the passage 10.

A valve stem 104 connected to the valve member 102 has a first end portion 110 operatively connected to a flexible diaphragm 112, and a second end portion 120 extending from the opposite side of the head of valve 102 through an opening 122 in the housing 98 and extending exteriorly thereof. The diaphragm 112 is disposed across an interior compartment within the housing 98 thereby forming a pressure chamber 114 on one side of the diaphragm opposite the valve stem 104 and an atmospheric chamber 116 on the other side of the diaphragm through which chamber the valve stem 104 extends. The atmospheric chamber 116 is vented through the housing 98 by a plurality of vents 118.

The valve member 102 is movable between a closed, passage sealing position where no venting of the flow passage 10 occurs and an open, venting position. Normally the valve 102 is held closed by the pressure within the chamber 114 which is applied against the diaphragm 112 to overcome atmospheric pressure in the chamber 116 and the pressure applied directly against the valve head 106 by the compressed air in passage 10. The valve 102 is moved to an open position by the combined action of pressure applied against the valve head and atmospheric pressure in the chamber 116 against the diaphragm 112 when the pressure chamber 114 on the other side of the diaphragm 112 is exhausted.

The pressure in the chamber 114 is controlled by the pressure regulator 96. The latter is operatively connected to the venting valve 94 by piping 124 which defines a flow passage in communication with the pressure chamber 114 to transmit to said chamber 114, the pressure existing in the fluid passage 10. As the diaphragm 112 has a surface area considerably greater than the effective surface area of the valve member 102, the pressure in the passage 10 normally maintains the venting valve in a closed nonventing position. The regulator 96 is therefore operable as a control to either transmit the pressure within the flow passage 10 to the chamber 114 or to exhaust the chamber 114 to atmosphere in response to a predetermined rise in the pressure level within the flow passage 10.

The regulator 96 includes a housing 126 defining an internal compartment intersected by a flexible diaphragm 128 to divide such compartment into pressure chamber 130 and an atmospheric chamber 132. The diaphragm 128 as illustrated is spring biased by a coil tension spring 134 adjustable by bolt 136 to vary the force on the diaphragm 128 to thereby establish the pressure level at which the flow passage 10 will be vented.

The regulator housing 126 defines a plurality of passageways and chambers through which the pressure medium flows selectively from the passageway 10 to the pressure chamber 114 and from the pressure chamber 114 to the atmosphere. In the illustrated embodiment, the regulator 96 is operatively connected to the supply line 9 by piping 138 connected between the regulator inlet 142 and the T fitting 100. A passageway 140 connects the inlet 142 with the chamber 130. Thus the pressure in the passageway 10 may be applied directly to the diaphragm 128. A second passageway 144 extends from the inlet 142 to a control chamber 146 having a control valve member 148 operatively mounted therein for selectively opening and closing a flow passage 150 to the piping 124 which, in turn, is connected to the pressure chamber 114 in the venting valve 94. The valve member 148 is operable to open and close communication between the chamber 114 and the passage 10. The valve 148 is biased toward a closed position by the spring 149. The valve 148 is opened against such bias by means of a rod 152 suitably connected to the diaphragm 128. The rod 152 has a head portion 154 engageable with the valve 148 for moving the latter to an open position.

As the pressure increases in the flow passage 10 above a predetermined level, the diaphragm 128 is forced against the spring 134 thereby pulling the head portion 154 of the rod 152 away from the valve member 148 allowing the spring 149 to close the valve member 148. The head member 154 on the rod 152 defines an abutment surface 153 to engage a second valve member 156, which normally is spring biased into closed engagement with its valve seat 158. A predetermined further increase of pressure within the flow passage 10 forces the valve member 156 away from its seat 158 to allow exhaustion of pressure from the chamber 114 through the chamber 160 and out to atmosphere through a vent 162. In this manner the reciprocal movement of the head portion 154 of the rod 152, as activated by the diaphragm 128, serves to open and close selectively the respective valve members 148 and 156 to transmit the fluid pressure in the passage 10 to the chamber 114 or to exhaust said chamber 114 to the atmosphere allowing the valve member 102 to open for venting of the passageway 10.

In the embodiment illustrated in FIGURE 2, the unloading valve actuating assembly 32 is comprised of a time delay circuit or system 163 initially activated by movement of the valve member 102 in the venting valve 94. The time delay circuit 163 is operatively coupled to a power source 166 and the solenoid valve 82. The time delay circuit 163, as illustrated, is responsive to the opening movement of the valve member 102 (FIGURE 4) which, as more fully described hereinafter, controls the operation of a switch 168. The time delay circuit 163 includes a time delay relay 170 and a double pole-double throw relay 172 which acts to de-energize the solenoid in the solenoid valve 82 to unload the compressor 22 after a predetermined interval during which the switch 168 remains open.

The switch 168 includes a pole 173 operatively coupled to the power source 166 by line 174 and a contact 175 operatively coupled to the coil of the time delay relay 170 by line 176. A closing of the pole 173 against contact 175 serves to energize the relay coil. The switch 168 is open when the valve member 102 is in a closed position. The closing of switch 168 by the opening of the valve 102 energizes the coil of the time delay relay 170 to close such relay after a predetermined time interval. The closing of the time delay relay 170 completes a circuit to the double pole-double throw relay 172 activating said relay to open a normally closed circuit 180 from the power source 166 to the solenoid valve 82 by moving a first pole 182 of relay 172 away from its contact. The opening of the circuit 180 results in unloading of the compressor 22.

The second pole 183 of relay 172 is operatively coupled through a contact to a pressure switch 184 in communication with the flow passage 10, and the coil of relay 172 by a holding circuit 181 when relay 172 is in a circuit breaking condition. The circuit 181 thus serves to hold relay 172 in a circuit opening or breaking position until a predetermined low level of pressure is attained in said passage 10 to thereby throw switch 184 which causes relay 172 to be de-energized. In this manner, the holding circuit 181 controls the unloading valve 48 after the compressor 22 is unloaded by maintaining the relay 172 in a circuit open position until a predetermined low pressure level is attained. The switch 184 is then opened to de-energize and release relay 172 to close circuit 180 and again load compressor 22.

As shown in FIGURE 4, the operation of the switch 168 is controlled by the movement of the valve member 102. The stem end portion 120 of the valve member 102 has a pair of laterally offset segments of full and reduced thickness which are alternately engageable by a roller 187 on the switch 168 to change the condition of switch 168. When the valve member 102 is moved to an open, venting position, the reduced thickness portion 185 of the valve stem 120 moves into contact with the roller element 187 causing said pole 173 to pivot into engagement with the contact 175 thereby closing the circuit to the time delay relay 170. When the valve 102 moves to a closed position, the roller element 187 moves into rolling contact with the thicker portion of the valve stem 120, thereby opening the circuit to the time delay relay 170.

The circuit to the time delay relay 170 must remain in an energized condition for a predetermined time interval prior to activation of the relay 172. Therefore, if the venting does not continue for the predetermined period, the solenoid valve 82 will not be de-energized and the compressor 22 will not be unloaded.

In the illustrated embodiment, the circuit 180 connected to the power source 166 and solenoid valve 82 includes a switch 188 for manually unloading the compressor 22 when so desired.

In operation, the fluid pressure supply system 20 provides air flow through the yarn delivery channels 2 of the tufting needles 3 (FIGURE 1) and adjusts automatically to variations in pressure demand imposed upon the system 20 by the tufting apparatus 1. The method of supplying the fluid pressure to the tufting apparatus 1 includes the steps of providing a fluid medium, in this instance, air, through the intake portion 46 of the supply line 9 to the compressor 22 through an air filter 49 and unloading valve body 48 and the compression of said air with the compressed air being delivered from the discharge side of the compressor 22 into the flow passage 10 for transmission to the tufting apparatus 1.

As the tufting apparatus 1 imposes varied demand requirements on the supply system 20 due to predictable or unpredictable stoppages, the system 20 selectively vents the compressed air from the fluid flow passage 10 when the pressure in the passage 10 rises above a predetermined level. The predetermined level of pressure at which the flow passage 10 is vented is set and may subsequently be adjusted by rotation of the bolt 136 on the pressure regulator 96 which varies the force exerted by the spring 134 on the diaphragm 128 within said regulator 96. The diaphragm 128 in combination with the spring 134, as previously discussed, controls the displacement of the rod 152 whose head portion 154 engages the opposed control valves 148 and 156 to close and open the venting valve 102 respectively.

In the open position, the valve member 102 is withdrawn from the valve seat 108 allowing the fluid pressure in the passageway 10 to escape to the atmosphere. This open position is attained by increased pressure on the diaphragm 128 causing the abutment surface 153 on the rod 152 to engage the control valve 156 opening the passage defined by the piping 124 from the chamber 114 to the atmosphere through the chamber 160 and the venting port 162. When the venting of the pressure chamber 114 occurs, the pressure within the passageway 10, as applied to the valve head 106, forces the valve head 102 to an open position. When the pressure level within the passageway 10 lowers below a predetermined level, the spring 134 forces the rod 152 away from the control valve 156 allowing said control valve to close against the seat 158. As pressure continues to drop in the system, the head portion 154 of the rod 152 is driven by the spring 134 into abutting relation to the control valve 148, opening valve 148 and allowing passage of fluid pressure through the regulator 96, piping 124 and into the pressure chamber 114 of the venting valve 94. In this condition, the same pressure exists in chamber 114 which exists in the passageway 10. Due to the difference in surface area between the diaphragm 112 and the valve head 102, the force exerted tending to close the valve 102 is greater forcing it against the valve seat 108 and retaining it in this position.

If the demand level remains at a low point, for instance, if the tufting machine were stopped for an extended period with the needles withdrawn from the backing 5 such that no air flow is experienced through the yarn delivery channels 2, the compressor 22 is unloaded by stopping the supply of air to the compressor 22 after continued venting of the flow passage 10. The unloading of the compressor 22 is accomplished by a time delay circuit 163 employed to break a power circuit to the solenoid valve 82 to thereby de-energize it. The solenoid valve thus allows the passage of control air to the chamber 60 in the unloading valve body 48 for driving the valve member 50 into a closed, passage blocking position to deprive the compressor 22 of its air supply. The time delay circuit 164 is initially energized by the closing of the switch 168 which is responsive to movement of the valve member 102. When the switch 168 is closed by the movement of the valve member 102 to a venting position, the coil of the time delay relay 170 is energized and after a predetermined time interval, the contacts of said relay 170 are closed, thereby energizing the double throw-double pole relay 172 to break the circuit 180 to the solenoid valve 82 thereby unloading the compressor 22. When the pressure in the flow passage 10 subsequently drops below a predetermined level, the pressure switch 184 is activated to de-energize the relay 172 to close the circuit 180 thereby energizing the solenoid valve 82 and loading the compressor 22 by exhaustion of the control air from the control chamber 60 in the unloading valve assembly 48. The circuit 181 through the pressure switch 184 serves as a holding means for maintaining the coil of the relay 172 in an energized state even after the compressor 22 is unloaded and venting has ceased causing the time delay relay 170 to open. Thus the relay 172 keeps the circuit 180 to the solenoid 82 in an open condition to thereby maintain the compressor 22 in an unloaded state until switch 184 is opened.

Figure 5:
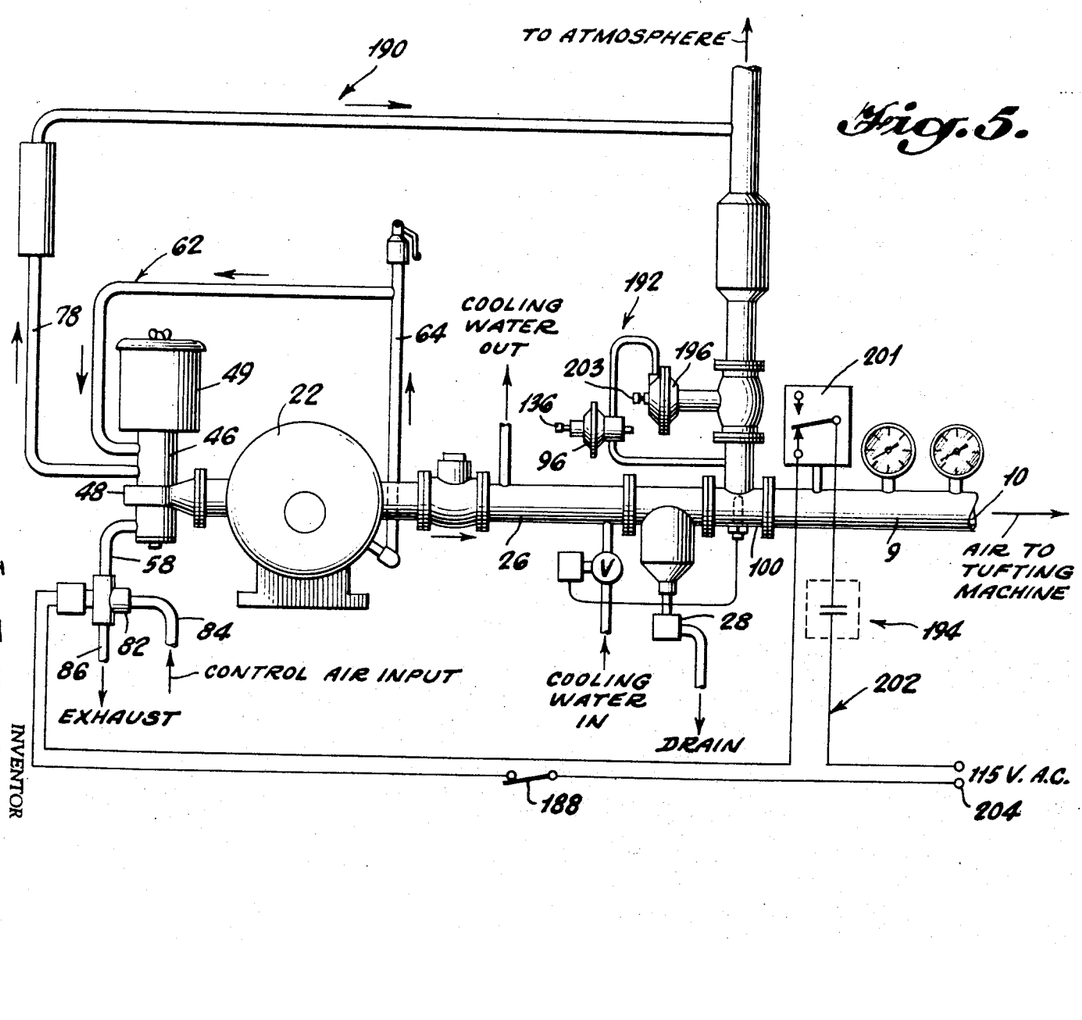
FIGURE 5 is a schematic view of a modified form of the fluid pressure supply system illustrated in FIGURE 2 wherein the compressor unloading is effected in response to pressure within the flow passage rather than a time delay system as illustrated in FIGURE 2.
Figure 6:
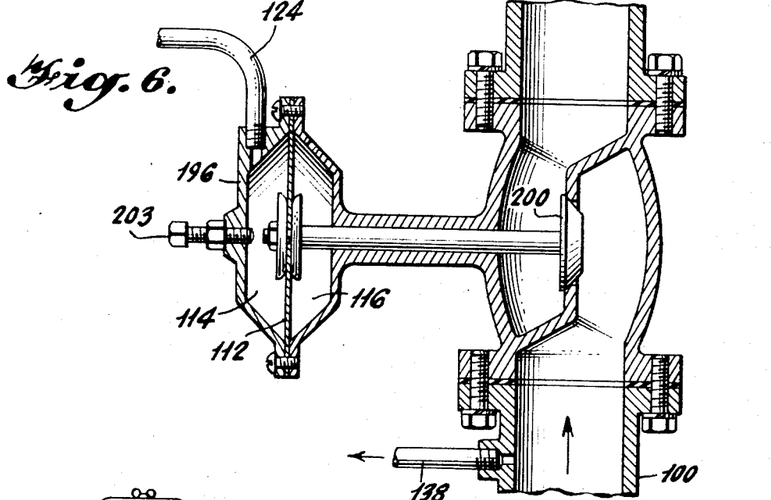
FIGURE 6 is a fragmentary vertical sectional view through the venting valve illustrated in FIGURE 5.

Referring to FIGURES 5 and 6, a modified form of a pressure supply system is illustrated and designated by the reference numeral 190, said system 190 having a venting assembly 192 similar to the venting assembly 30 previously discussed and an unloading valve actuating assembly or system 194 operable in response to the pressure level in the flow passage 10. The system 190, as illustrated, is in all other aspects identical to system 20.

As illustrated, the venting assembly 192 includes a venting valve 196 and a pressure regulator 96 which is identical to that previously described and is connected to the venting valve 196 in the same manner as previously discussed. The venting valve 196 differs from the venting valve 94 only in the manner employed for activating the compressor unloading assembly. The valve member 200 is designed to partially open to provide a restricted opening through which the passage 10 is vented. This restriction permits a continued increase in the pressure level in the passage 10 if the demand level remains below a predetermined point. As illustrated, the extent to which the valve member 200 may be opened is established by the bolt 203 which stops the movement of the member 200 at a point determined by the setting of said bolt 203. If the bolt is moved inwardly of the chamber 114, the degree of venting is reduced, thus pressure build-up occurs faster in passageway 10 and unloading of compressor 22 is likewise quicker.

The unloading valve actuating assembly 194 includes a pressure switch 201 operatively connected in communication with the flow passage 10 and operatively coupled in a power circuit 202 connecting the solenoid valve 82 to a power source 204. The pressure switch 201 is set to open circuit 202 at a pressure level within the flow passage 10 greater than the pressure level at which the regulator 96 is set to vent the flow passage 10. When the switch 201 is opened, the solenoid valve 82 is de-energized to thereby unload the compressor 22. The pressure switch 201 is also set to close the circuit 202 to thereby re-energize the solenoid valve 82 at a pressure level in the flow passage 10 less than the pressure level at which the regulator 96 is set to activate the venting valve 196 and thus reload the compressor 22 after a pressure drop has occurred in the system.

In operation of the embodiment illustrated in FIGURE 5 and designated as the pressure supply system 190, the venting valve 196 has a valve member 200 which is set for movement upon exhaustion of the pressure chamber 114 to a partially open position wherein the venting of the compressed fluid medium from the flow passage 10 is at a rate less than the discharge of the compressor 22 whereby the pressure within the flow passage 10 will continue to build if the demand remains below a predetermined level. In this embodiment, the compressor unloading assembly 194 is activated in response to the attainment of a predetermined pressure level in the flow passage 10 rather than the expiration of a fixed time interval after venting is commenced as is the case in the embodiment of FIGURE 2. If the pressure in the flow passage 10 builds to a predetermined level above the level set for venting of the flow passage 10, the pressure switch 201 will open the normally closed circuit 202 between the power source 204 and the solenoid valve 82 to de-energize said valve 82 and unload the compressor 22. The pressure switch 194 is also set to close circuit 202 when the pressure within the flow passage 10 subsequently drops below a predetermined level after unloading of the compressor 22 to re-energize the solenoid valve 82 and thereby load the compressor 22.

Figure 7:
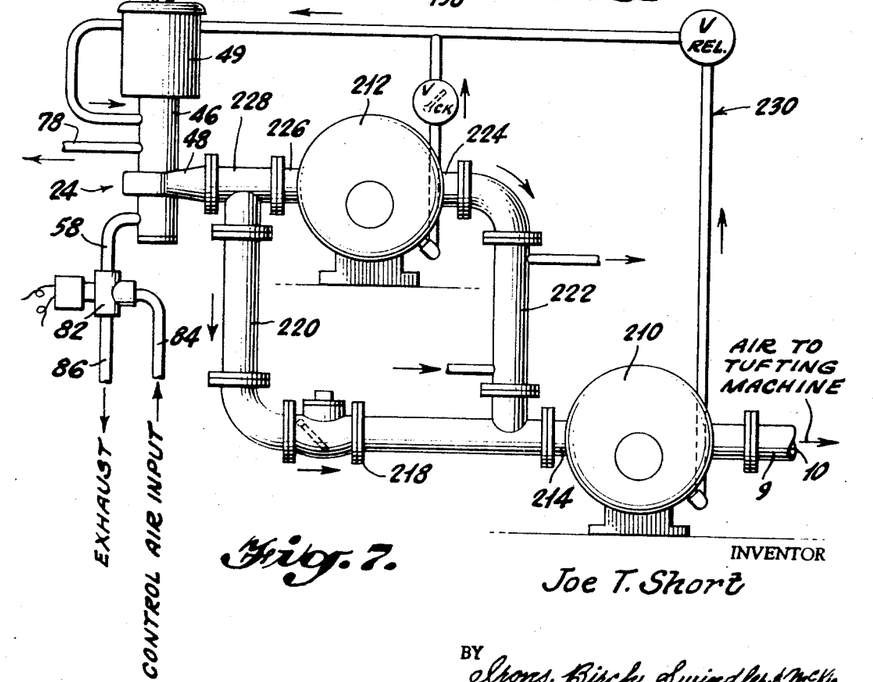
FIGURE 7 is a schematic view of a modified form of a compressing system utilizing two compressors which may be operated either singularly or in series to provide low or high pressure respectively to the tufting machine.

Referring to FIGURE 7, a combination of compressors is illustrated which may be employed in either system 20 or system 190 to attain a flexible single or two-stage fluid compression. In operation of a multi-needle tufting machine, it is desirable to operate at low pressures while tufting certain yarns; however, other yarns having higher coefficients of friction require a higher pressure in order to properly project the yarn from the needle. In order to save power while operating at low pressure, a low pressure compressor 210 is provided which may be operated singularly in such a situation or in series as a second stage compressor with a second compressor 212 to provide high pressure in the fluid passage 10.

As illustrated, the low pressure compressor 210 has an inlet 214 operatively connected by piping 220 through a check valve 218 and through the unloading valve body 48 to the air intake filter 49. A piping loop 222 is provided to selectively connect the inlet 214 of compressor 210 to the discharge 224 of the compressor 212. The compressor 212 has an inlet 226 operatively connected to the filter 49 through the unloading valve body 48 by a piping T227. If desired, the T228 may contain a valve which may be manually operated to direct the air supply to either of the compressors. However, when the compressor 212 is operating, the check valve 218 prevents back flow through the pipe 220. Each of the compressors 210 and 212 are connected to a compressor bleeding system 230 identical in operation to the bleeding system 62, previously discussed.

By utilization of the aforedescribed two-stage compressor system, the low pressure compressor 210 may be operated singularly or in series with the compressor 212 receiving the compressed air through loop 222 to the inlet 214 of the compressor 210 thereby providing a two-stage compressor operation. In this manner, considerable savings may be effected by operation of the low pressure compressor 210 only when the tufting machine is utilizing yarns which require a low pressure air flow through the individual needles.

What is claimed is:
1. A fluid pressure supply system comprising:
 (a) means defining a fluid flow passage,
 (b) means operatively connected in said passage for compressing said fluid to develop a fluid pressure in said passage, said compressing means having an intake side and a discharge side in communication with said flow passage, said flow passage having a fluid intake line leading to said intake side and a fluid delivery line extending from said discharge side to a point of use,
 (c) venting valve means in communication with said fluid delivery line for selectively venting the compressed fluid mdeium from said fluid delivery line,
 (d) unloading valve means operatively mounted in the fluid intake line of said flow passage for selectively opening and closing said intake line to said fluid compressing means,
 (e) first control means in communication with said fluid delivery line to selectively open said venting valve means in response to a predetermined excessive pressure in said fluid delivery line to vent said excessive pressure and to close said venting valve means when said excessive pressure has been alleviated,
 (f) second control means to close said unloading valve means to unload said compressing means only in response to a predetermined condition which includes a continuation of said excessive pressure despite continued venting of said excessive pressure by said open venting valve means,
 (g) said first and second control means being separately operable to permit said venting valve to be opened and subsequently closed without closing said unloading valve means whenever said excessive pressure occurs but is alleviated without the occurrence of said predetermined condition.

2. A fluid pressure supply system as recited in claim 1 wherein said predetermined condition requires the continuation of said excessive pressure for a predetermined time, whereby said second control means closes said unloading valve only when venting has continued for said predetermined time.

3. A fluid pressure supply system as recited in claim 1, wherein said predetermined condition requires an increase in pressure in said flow passage to a predetermined level greater than said excessive pressure whereby venting is initiated at a first pressure and said unloading is effected when the pressure in said fluid delivery line rises to a predetermined greater level.

4. A fluid pressure supply system as recited in claim 2, wherein said second control means is comprised of a time delay means to actuate said unloading valve means to close the fluid intake line of said flow passage thereby unloading said compressing means after said venting of the compressed fluid from the fluid delivery line of the flow passage has continued for a predetermined time interval.

5. A fluid pressure supply system as recited in claim 4 wherein said venting valve means includes a valve member movable between an open, venting position and a closed passage sealing position and means engageable with said member for moving said member between said positions responsively to the pressure level in the fluid delivery line of said flow passage, said time delay means including means engageable with said movable member for activation of said time delay means to unload said compressing means after said predetermined time interval.

6. A fluid pressure supply system as recited in claim 5, wherein said unloading valve means includes means responsive to a change in electrical condition to open and close said passage and wherein said time delay means includes:
(a) switching means operatively engageable by said movable valve member to change the condition of said switching means when said member is moved to an open, venting position,
(b) a time delay circuit operatively connected to said electrically responsive means in the unloading valve means and said switching means, said circuit including means responsive to a change in the condition of the switching means for activation of said electrically responsive means in said unloading valve means after a predetermined time interval of venting the pressure medium from the flow passage.

7. A fluid pressure supply system as recited in claim 6 wherein said time delay circuit includes a time delay relay and a power source, said time delay relay being operatively coupled to said power source and said switching means whereby a change in position of said switching means actuates said time delay relay, and means operatively connected to said time delay relay and said unloading valve means for actuating said unloading valve means for closing the intake line of said flow passage a predetermined time after said time delay relay is actuated to unload said compressing means.

8. A fluid pressure supply system as recited in claim 2 wherein said second control means further includes means in communication with the delivery line of said flow passage responsive to the pressure in said delivery line to actuate said unloading valve means to open the intake line of said flow passage to said compressing means when the pressure in the delivery line of said flow passage drops below a predetermined level to thereby reload the compressing means.

9. A fluid pressure supply system as recited in claim 8 wherein said compressor reloading means is responsive to a predetermined pressure less than the excessive pressure to which said venting means is responsive.

10. A fluid pressure supply system as recited in claim 1 including means operatively mounted in said flow passage on the discharge side of said compressing means to retain pressure within the delivery line of said flow passage downstream from the compressing means when the compressing means is unloaded.

11. A fluid pressure supply system as recited in claim 10 including means operatively connected to said compressing means in communication with the discharge side thereof and operable in response to the unloading of said compressing means to bleed off entrapped fluid in the compressing means whereby the compressing means may operate under reduced pressure while unloaded to effectively reduce the power required to operate said compressing means.

12. A fluid pressure supply system as recited in claim 6, wherein said venting valve means includes:
(a) a valve member in communication with the delivery line of said flow passage and movable between an open passage venting position and a closed, passage sealing position and means for moving said valve member between open and closed positions,
(b) a regulator means operatively connected to said valve moving means and in communication with the delivery line of said flow passage to actuate said valve moving means in response to predetermined pressure variations in said flow passage.

13. A fluid pressure supply system as recited in claim 12, wherein said valve moving means comprises a flexible diaphragm and means defining a pressure chamber on one side of said diaphragm, said diaphragm being connected to said valve member for imparting a passage closing force thereon and wherein said regulator means is operatively connected to said pressure chamber with means for selectively transmitting said pressure in the delivery line of said flow passage to said pressure chamber and venting said pressure chamber to the atmosphere, the surface area of said diaphragm being greater than the surface area of said valve member in communication with the delivery line of said flow passage such that the closing force exerted on said valve member when pressure is transmitted to said pressure chamber exceeds the valve opening force exerted on the valve member by the pressure in the delivery line of said flow passage to thereby close said valve member and whereby the venting of said chamber to atmosphere allows the pressure on said valve member to open said venting valve means for venting the compressed fluid medium from the delivery line of said passage.

14. A fluid pressure supply system as recited in claim 13 wherein said valve member includes a portion having at least two laterally spaced segments and wherein said switching means includes a switch pole having follower means operatively connected thereto and employed in engagement with the two segments of said valve member whereby movement of said valve member to said opened and closed positions places said follower means in contacting relation to said segments respectively whereby the lateral spacing of said segments displaces said switch pole between make and break positions to change the electrical condition of the time delay circuit.

15. A fluid pressure supply system as recited in claim 3 wherein said second control means further includes means in communication with the delivery line of said flow passage and responsive to the pressure in the delivery line of said passage to actuate said unloading valve means to open said flow passage to said compressing means when the pressure in the delivery line of said flow passage drops below a predetermined level to thereby reload the compressing means.

16. A fluid pressure supply system as recited in claim 15 wherein said compressor reloading means is responsive to a predetermined pressure in said delivery line less than the predetermined pressure to which said venting means is responsive.

17. A fluid pressure supply system as recited in claim 16 further including an electrical circuit means having a power source coupled therein and wherein the venting valve means includes means responsive to the pressure level in the delivery line of said flow passage for venting said passage when the pressure reaches a predetermined level and wherein the second control means is comprised of first and second pressure responsive switching means, said first switching means being set for activation at a pressure level greater than the pressure level established for activation of the venting valve means and said second switching means being set for activation at a pressure level less than the pressure level established for activation of the venting valve means, said unloading valve means including means operatively coupled by said electrical circuit to said first and second switching means and responsive to electrical changes in said circuit effected by said switching means to actuate such unloading valve means to open and close the intake line of said passage to load and unload respectively said compressing means.

18. A fluid pressure supply system as recited in claim 17 wherein the venting valve means vents at a rate less than the rate of discharge of the compressing means whereby the pressure will continue to build in the delivery line of said flow passage during venting, when the demand on the system remains below a predetermined level, to the level established for activation of the second control means to unload the compressing means.

19. In a multiple needle tufting machine embodying hollow needles having yarn delivery channels therein through which channels fluid is passed to project yarn through the needles while they are inserted through a backing material and a fluid pressure supply system, the improvement in said system which comprises:
(a) means defining a fluid flow passage,
(b) means operatively connected in said passage for compressing said fluid to develop a fluid pressure in said passage, and compressing means having an intake side and a discharge side in communication with said flow passage, said flow passage having a fluid intake line leading to said intake side and a fluid delivery line extending from said discharge side to the yarn delivery channels of said needles, (c) venting valve means in communication with said fluid delivery line for selectively venting the compressed fluid medium from said fluid delivery line, said fluid delivery line being open from said venting valve means to said yarn delivery channels so that fluid pressure at the yarn delivery channels may be reduced by such venting, (d) unloading valve means operatively mounted in the fluid intake line of said flow passage for selectively opening and closing said intake line to said fluid compressing means, (e) first control means to selectively open said venting valve means to vent the fluid delivery line of said flow passage in response to a predetermined excessive pressure in said fluid delivery line and to close said venting valve means when said excessive pressure has been alleviated, (f) second control means to close said unloading valve means to unload said compressing means only in response to a predetermined condition which includes a continuation of said excessive pressure resulting from the failure of said open venting valve means to alleviate said excessive pressure, (g) said first and second control means being separately operable to permit said venting valve to be opened and subsequently closed without closing said unloading valve means whenever said excessive pressure occurs but is alleviated without the occurrence of said predetermined condition.

20. A tufting machine as recited in claim 19, wherein said predetermined condition requires the continuation of said excessive pressure for a predetermined time, whereby said second control means closes said unloading valve only when venting has continued for said predetermined time.

21. A tufting machine as recited in claim 19 wherein said predetermined condition requires an increase in pressure in said flow passage to a predetermined level greater than said excessive pressure whereby venting is initiated at a first pressure and said unloading is effected when the pressure in said fluid delivery line rises to a predetermined greater level.

22. A tufting machine as recited in claim 20, wherein the second control means is comprised of a time delay means to actuate said unloading valve means to close the intake side of said flow passage to the compressing means thereby unloading said compressing means after said venting of the compressed fluid from the delivery line of said flow passage has continued for a predetermined time interval.

23. A tufting machine as recited in claim 22 wherein said venting valve means includes a valve member movable between an open, venting position and a closed passage sealing position and means engageable with said valve member for moving said valve member between said positions responsively to the pressure level in said flow passage, said time delay means including means engageable with said movable valve member for activation of said time delay means to unload said compressing means after said predetermined time interval.

24. A tufting machine as recited in claim 23, wherein said unloading valve means includes means responsive to a change in electrical condition to open and close the intake line of said fluid flow passage and wherein said time delay means includes:

(a) switching means operatively engageable by said movable valve member to change the condition of said switching means when said valve member is moved to an open, venting position, (b) a time delay circuit operatively connected to said electrically responsive means in the unloading valve means and said switching means, said circuit including means responsive to a change in the condition of the switching means for activation of said electrically responsive means in said unloading valve means after a predetermined time interval of venting the pressure fluid from the delivery line of the flow passage.

25. A tufting machine as recited in claim 10 wherein said second control means further includes means in communication with the delivery line of said flow passage on the discharge side of said compressing means and responsive to the pressure in said delivery line to actuate said unloading valve means to open the intake line of said flow passage to said compressing means when the pressure in the delivery line of said flow passage drops below a predetermined level to thereby reload the compressing means.

26. A tufting machine as recited in claim 25 wherein said compressor reloading means is responsive to a predetermined pressure less than the predetermined pressure to which said venting valve means is responsive.

27. A tufting machine as recited in claim 19, including means operatively mounted in said flow passage on the discharge side of said compressing means to retain pressure within the delivery line of the flow passage downstream from the compressing means when the compressing means is unloaded.

28. A tufting machine as recited in claim 27 including means operatively connected to said compressing means in communication with the discharge side thereof and operable in response to the unloading of said compressing means to bleed off entrapped fluid in the compressing means whereby the compressing means may operate under reduced pressure while unloaded to effectively reduce the power required to operate said compressing means.

29. A tufting machine as recited in claim 24, wherein said venting valve means includes:

(a) a valve member in communication with the delivery line of said flow passage and movable between an open, passage venting position and a closed, passage sealing position and means for moving said valve member between open and closed positions, (b) a regulator means operatively connected to said valve moving means and in communication with the delivery line of said flow passage to actuate said valve moving means in response to predetermined pressure variations in the delivery line of said flow passage.

30. A tufting machine as recited in claim 29, wherein said valve moving means comprises a flexible diaphragm and means defining a pressure chamber on one side of said diaphragm, said diaphragm being connected to said valve member for imparting a passage closing force thereon and wherein said regulator means is operatively connected to said pressure chamber with means for selectively transmitting said pressure in the delivery line of said flow passage to said pressure chamber and venting said pressure chamber to the atmosphere, the surface area of said diaghragm being greater than the surface area of said valve member in communication with the delivery line of said flow passage such that the closing force exerted on said valve member when pressure is transmitted to said pressure chamber exceeds the valve opening force exerted on the valve member by the pressure in the delivery line of said flow passage to thereby close said valve member and whereby the venting of said chamber to atmosphere allows the pressure on said valve member to open said venting valve means for venting the compressed fluid from the delivery line of said passage.

31. A tufting machine as recited in claim 30, wherein said valve member has a portion having at least two laterally spaced segments and wherein said switching means includes a switch pole having follower means operatively connected thereto and employed in engagement with the two segments of said valve member whereby movement of said valve member to said opened and closed positions places said follower means in contacting relation to said segments respectively whereby the lateral spacing of said segments displaces said switch pole between make and break positions to change the electrical condition of the time delay circuit.

32. A tufting machine as recited in claim 21 wherein said second control means further includes means in communication with the delivery line of said flow passage responsive to the pressure in the delivery line of said passage to actuate said unloading valve means to open the intake line of said flow passage to said compressing means when the pressure in the delivery line of said flow passage drops below a predetermined level to thereby reload the compressing means.

33. A tufting machine as recited in claim 32 wherein said compressor reloading means is responsive to a predetermined pressure less than the excessive pressure to which said venting valve means is responsive.

34. A tufting machine as recited in claim 33 further including an electrical circuit means having a power source coupled therein and wherein the venting valve means includes means responsive to the pressure level in the delivery line of said flow passage for venting said passage when the pressure reaches a predetermined level and wherein the second control means is comprised of first and second pressure responsive switching means, said first switching means being set for activation at a pressure level greater than the pressure level established for activation of the venting valve means and said second switching means being set for activation at a pressure level less than the pressure level established for activation of the venting valve means, said unloading valve means including means operatively coupled by said electrical circuit to said first and second switching means and responsive to electrical changes in said circuit effected by said switching means to actuate such unloading valve means to open and close the intake line of said passage to load and unload respectively said compressing means.

35. A tufting machine as recited in claim 34 wherein the venting valve means vents at a rate less than the rate of discharge of the compressing means whereby the pressure will continue to build in the delivery line of said flow passage during venting, when the demand on the system remains below a predetermined level, to the level established for activation of the second control means whereby the compressing means is then unloaded.

36. A fluid pressure supply system as recited in claim 19 wherein the compressing means includes two separate compressors and means to selectively connect one or both of said compressors to said flow passage.

37. A method of supplying fluid pressure in a system having variable demands thereon comprising the steps of:
(a) supplying a fluid medium,
(b) compressing said fluid medium by a fluid compressing means in said system to provide a fluid pressure in a fluid delivery line in said system,
(c) selectively venting said compressed fluid medium from said delivery line when an excessive pressure in said delivery line is attained,
(d) ceasing the venting of said compressed fluid medium from said delivery line when the venting of the delivery line alleviates said excessive pressure,
(e) ceasing the supply of the fluid medium to the compressing means when continued venting fails to alleviate said excessive pressure to thereby unload said compressing means 38. A method as recited in claim 37 wherein the supply of the fluid medium to the compressing means is ceased after said venting is maintained for a predetermined time interval.

39. A method as recited in claim 38 wherein the venting of the compressed fluid medium from the system initiates a time delay means for stopping the supply of the fluid medium to the compressing means after said predetermined time interval.

40. A method as recited in claim 37 further including the steps of sealing the system at the discharge side of the compressing means after unloading the compressor means to prevent back flow of the fluid medium from said delivery line to said compressing means and bleeding off the compressed fluid remaining in the compressing means to thereby allow said compressor means to operate in substantially a vacuum.

41. A method as recited in claim 37 wherein the supply of the fluid medium to the compressing means is ceased after said excessive pressure rises to a predetermined level greater than said excessive pressure.

42. A method as recited in claim 41 wherein the venting of the compressed fluid medium from the delivery line is at a rate less than the discharge of the compressing means whereby pressure will continue to build within the delivery line when the demand remains below a predetermined level and wherein the supply of the fluid medium to the compressing means is ceased after continued venting when the pressure in the system reaches said predetermined level.

43. A fluid pressure supply system as recited in claim 1 further including means at the discharge side of said compressing means and in said flow passage for preventing back flow of the pressure fluid medium to said compressing means from the fluid delivery line when said compressing means is unloaded, said venting valve means being downstream of said back flow preventing means.

44. A tufting machine as recited in claim 19 further including means at the discharge side of said compressing means and in said flow passage for preventing back flow of the pressure fluid medium to said compressing means from the fluid delivery line when said compressing means is unloaded, said venting valve means being downstream of said back flow prevention means.

45. A fluid pressure supply system comprising:
(a) means defining a fluid flow passage,
(b) means operatively connected in said passage for compressing said fluid to develop a fluid pressure in said passage, said compressing means having an intake side and a discharge side in communication with said flow passage, said flow passage having a fluid intake line leading to said intake side and a fluid delivery line extending from said discharge side to a point of use,
(c) venting valve means in communication with said fluid delivery line for selectively venting the compressed fluid medium from said fluid delivery line,
(d) unloading valve means operatively mounted in the fluid intake line of said flow passage for selectively opening and closing said intake line to said fluid compressing means,
(e) first control means to selectively open said venting valve means to vent the fluid delivery line of said flow passage in response to a predetermined excessive pressure in said fluid delivery line and to close said venting valve means when said excessive pressure has been alleviated,
(f) second control means to close said unloading valve means to unload said compressing means in response to a continuation of said excessive pressure for a predetermined time.

46. A fluid pressure supply system comprising:
(a) means defining a fluid flow passage,
(b) means operatively connected in said passage for compressing said fluid to develop a fluid pressure in said passage, said compressing means having an intake side and a discharge side in communication with said flow passage, said flow passage having a fluid intake line leading to said intake side and a fluid delivery line extending from said discharge side to a point of use,
(c) venting valve means in communication with said fluid delivery line for selectively venting the compressed fluid medium from said fluid delivery line,
(d) unloading valve means operatively mounted in the fluid intake line of said flow passage for selectively opening and closing said intake line to said fluid compressing means,
(e) first control means to selectively open said venting valve means to vent the fluid delivery line of said flow passage in response to a predetermined excessive pressure in said fluid delivery line and to close said venting valve means when said excessive pressure has been alleviated,
(f) second control means to close said unloading valve means to unload said compressing means in response to an increase of said excessive pressure to a predetermined higher pressure.

References Cited

UNITED STATES PATENTS

| | | | |
|---|---|---|---|
| 1,216,119 | 2/1917 | Hinz | 230—23 |
| 1,390,829 | 9/1921 | Smoot | 230—138 |
| 1,616,992 | 2/1927 | Ruckstuhl | 230—138 XR |
| 1,948,907 | 2/1934 | Egli | 230—138 |
| 3,217,675 | 11/1965 | Short. | |

FOREIGN PATENTS 166,144  6/1950  Germany.

JAMES R. BOLER, *Primary Examiner.*

U.S. Cl. X.R.

230—23, 138